(12) United States Patent
Miyashita et al.

(10) Patent No.: US 7,196,442 B2
(45) Date of Patent: Mar. 27, 2007

(54) MOTOR ENCODER

(75) Inventors: Kunio Miyashita, Nagano-ken (JP); Junji Koyama, Nagano-ken (JP)

(73) Assignee: Harmonic Drive Systems Inc., Tokyo (JP)

( * ) Notice: Subject to any disclaimer, the term of this patent is extended or adjusted under 35 U.S.C. 154(b) by 301 days.

(21) Appl. No.: 10/904,673

(22) Filed: Nov. 22, 2004

(65) Prior Publication Data
US 2005/0127762 A1 Jun. 16, 2005

(30) Foreign Application Priority Data
Dec. 15, 2003 (JP) ............................. 2003-415910

(51) Int. Cl.
*H02K 11/00* (2006.01)
(52) U.S. Cl. ................. 310/68 B; 324/207.25
(58) Field of Classification Search ............ 310/68 B; 324/207.25, 260, 207.15
See application file for complete search history.

(56) References Cited

U.S. PATENT DOCUMENTS 4,982,146 A * 1/1991 Moteki ....................... 318/696
5,155,401 A * 10/1992 Kanaya et al. ................ 310/89
6,552,453 B2 * 4/2003 Ohiwa et al. ............. 310/68 B

* cited by examiner

*Primary Examiner*—Darren Schuberg
*Assistant Examiner*—Nguyen N. Hanh
(74) *Attorney, Agent, or Firm*—Buchanan Ingersoll & Rooney PC

(57) ABSTRACT

An encoder mounted on a motor axle of an AC servomotor has a single bipolarly magnetized rotational disk, magnetic sensors for outputting X- and Y-signals that differ in phase by 90° in association with the rotation thereof, and a signal processing unit. The signal processing unit computes at predetermined cycles a rotor angle $\theta a$ of a motor rotor on the basis of the X- and Y-phase signals, generates three-phase magnetic pole signals U, V, and W that differ in phase by 120° on the basis of the number M of magnetic poles of a motor, a magnetic pole reference angle $\theta o$, and the rotor angle $\theta a$; and generates A- and B-phase signals with predetermined pulse cycles that differ in phase by 90° on the basis of the rotor angle $\theta a$. An encoder that is advantageous for reducing the size and weight of an AC servomotor can be realized because it is sufficient to provide a single assembly composed of a rotational disk and magnetic sensors.

4 Claims, 10 Drawing Sheets

PRIOR ART

PRIOR ART

PRIOR ART

PRIOR ART

PRIOR ART

PRIOR ART

MOTOR ENCODER

BACKGROUND OF THE INVENTION

1. Field of the Invention

The present invention relates to a motor encoder for detecting the rotational position of a motor, and more particularly relates to a motor encoder capable of generating three-phase magnetic pole signals U, V, and W that differ in phase by 120° and indicate the pole positions of the motor rotor.

2. Description of the Related Art

FIG. 5 shows a commonly known three-phase AC servomotor. In an AC servomotor 100, a encoder 110 for detecting the position of the motor rotor, and a magnetic pole detection mechanism 120 for detecting the magnetic pole position of the motor are mounted on the rear end portion of a motor axle 102 on which a motor rotor 101 is integrally formed. A- and B-phase signals that differ in phase by 90° and are output from the encoder 110, and magnetic pole signals U, V, W that differ in phase by 120° and are output from the magnetic pole detection mechanism 120 are fed to a servo driver 130. The servo driver 130 is provided with a receiver circuit unit 131 for receiving these signals and a control circuit unit 132 for driving and controlling the AC servomotor 100 on the basis of commands from a host system 140 and the received signals.

The encoder 110 is provided with a rotational body 11 fixed coaxially with the motor axle 102, a pair of magnetic sensors 112A and 112B that face an external peripheral surface of the rotational body 11 via a fixed gap, and a signal processing circuit 113. The rotational body 11 is configured so that magnetic poles N and S are formed with a fixed pitch along a circular external peripheral surface, as shown in FIG. 6. The relative positions of the pair of magnetic sensors 112A and 112B are set so that A-phase and B-phase sinusoidal detection signals that differ in phase by 90° can be obtained in association with the rotation of the rotational body 111. The signal processing circuit 113 generates the A-phase and B-phase signals with the constant pulse cycles shown in FIG. 7 from the signals fed from the magnetic sensors 112A and 112B, and feeds these signals to the servo driver 130.

The magnetic pole detection mechanism 120 is provided with a magnetic pole rotational body 121 fixed coaxially with the motor axle 102, three magnetic sensors 122U, 122V, and 122W that face an external peripheral surface of the rotational body 121 via a fixed gap, and a signal processing circuit 123. The magnetic pole rotational body 121 is polarized in the same manner as the motor rotor 101, and is a quadrupolar magnet as shown in FIG. 8. The relative positions of three magnetic sensors 122U, 122V, and 122W are set so as to obtain a U-phase detection signal, a V-phase detection signal, and a W-phase detection signal in the form of sinusoidal waves that differ in phase by 120°, such as those shown in FIG. 9, in association with the rotation of the magnetic rotational body 121. The signal processing circuit 123 generates the U-, V-, and W-phase signals shown in FIG. 10 from the signals fed from the magnetic sensors 122U, 122V, and 122W, and feeds these signals to the servo driver 130.

Thus, an encoder and a magnetic pole detection mechanism are both required in a conventional three-phase AC servomotor, and these are disposed in the rear end portion of the motor axle. It would therefore be very advantageous for reducing the size and weight of the AC servomotor to provide these components in a small and compact configuration.

SUMMARY OF THE INVENTION

In view of these points, a main object of the present invention is to provide a motor encoder capable of generating A-phase and B-phase signals that indicate the position of a motor rotor, and three-phase magnetic pole signals that indicate the magnetic pole position of the motor.

To solve the above and other problems, a motor encoder of the present invention has a bipolarly magnetized rotational body fixed coaxially on a motor axle; an X-phase magnetic sensor and a Y-phase magnetic sensor which are disposed facing an external peripheral surface of the rotational body and which output an X-phase signal and a Y-phase signal in the form of sinusoidal waves that differ in phase by 90° in association with the rotation of the rotational body; a rotor angle computing circuit for computing at prescribed cycles a rotational angle of a motor rotor on the basis of the X-phase signal and Y-phase signal; a magnetic pole signal generating circuit for generating three-phase magnetic pole signals U, V, and W that differ in phase by 120° on the basis of the number M of magnetic poles of a motor and the computed rotor angle θa; and an AB-phase signal generating circuit for generating an A-phase signal and a B-phase signal at predetermined cycles that differ in phase by 90° on the basis of the rotor angle θa computed at prescribed cycles. Here, the number of magnetic poles of the motor is commonly taken to be M=kN (where k is an integer of 2 or greater), with N being the number of magnetic poles of the rotational body.

Next, a motor encoder of the present invention has a bipolarly magnetized rotational body fixed coaxially with a motor axle; an X-phase magnetic sensor and a Y-phase magnetic sensor which are disposed facing an external peripheral surface of the rotational body and which output an X-phase signal and a Y-phase signal in the form of sinusoidal waves that differ in phase by 90° in association with the rotation of the rotational body; a rotor angle computing circuit for computing at prescribed cycles a rotational angle of a motor rotor on the basis of the X-phase signal and Y-phase signal; a magnetic pole signal generating circuit for generating three-phase magnetic pole signals U, V, and W that differ in phase by 120° on the basis of the number M of magnetic poles of a motor, a magnetic pole reference angle θo that indicates a magnetic pole position of the motor with respect to a magnetic pole position of the rotational body, and the computed rotor angle θa; and an AB-phase signal generating circuit for generating an A-phase signal and a B-phase signal at predetermined cycles that differ in phase by 90° on the basis of the rotor angle θa computed at prescribed cycles. In this case as well, the number of magnetic poles of the motor is commonly taken to be M=kN (where k is an integer of 2 or greater), with N being the number of magnetic poles of the rotational body.

The motor encoder of the present invention generates A- and B-phase signals and three-phase signals U, V, and W that indicate the magnetic pole position by using detection signals from a pair of magnetic sensors disposed facing the external peripheral surface of a single rotational body fixed to a motor axle. Therefore, using the motor encoder of the present invention ensures a smaller and lighter configuration in comparison with a conventional AC servomotor in which the magnetic sensors and rotational body for the encoder, and the magnetic sensors and rotational body for magnetic pole detection are disposed at the rear end of the motor axle.

DESCRIPTION OF THE PREFERRED EMBODIMENTS

Described below with reference to the drawings is an example of a three-phase AC servomotor provided with a motor encoder to which the present invention has been applied.

Figure 1:
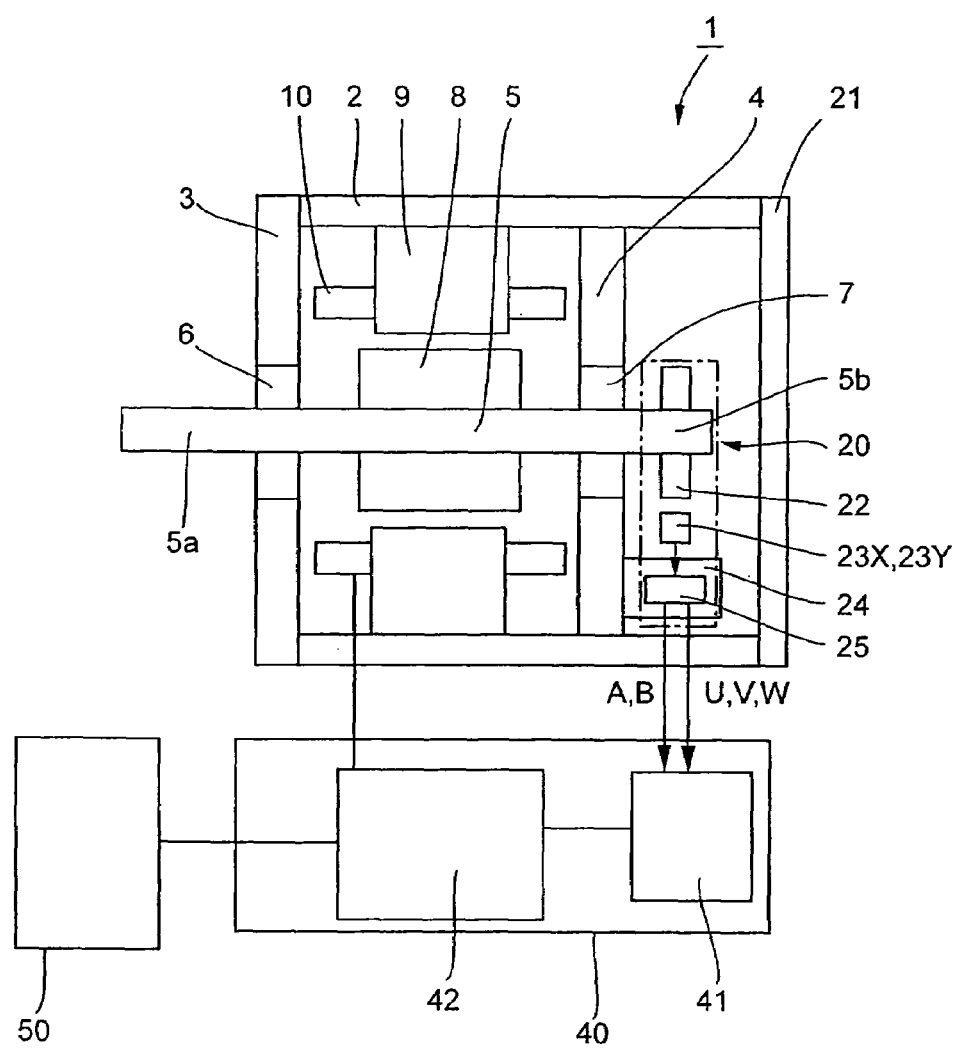
FIG. 1 is a schematic block diagram of an AC servomotor to which the present invention is applied.

FIG. 1 is a schematic block diagram showing a three-phase AC servomotor according to the present invention. The basic configuration of an AC servomotor 1 is the same as that of a common AC servomotor in that both ends of a cylindrical motor housing 2 are sealed by end brackets 3 and 4, and a motor axle 5 is disposed so as to pass completely through center portions of these end brackets 3 and 4. The motor axle 5 is rotatably supported by the end brackets 3 and 4 via bearings 6 and 7. A motor rotor 8 is integrally and coaxially formed on a portion of the motor axle 5 inside the motor housing 2, and a motor stator 9 is fixed to an internal peripheral surface of the motor housing 2 with a fixed gap around an outside of the motor rotor 8. A motor winding 10 is mounted on the motor stator 9.

A front end portion 5a of the motor axle 5 projects forward from the front end bracket 3 and is connected to a load side via a reduction gear or the like. A rear end portion 5b of the motor axle 5 projects rearward from the rear end bracket 4, and an encoder 20 is disposed on the rear end portion 5b. The encoder 20 is covered with an encoder cover 21 mounted on a rear end portion of the motor housing 2.

The encoder 20 is provided with a rotational disk 22 fixed coaxially on the rear end portion 5b of the motor axle 5, a pair of magnetic sensors (X- and Y-phase sensors) 23X and 23Y that face an external peripheral surface of the rotational disk 22 via a fixed gap, and a signal processing circuit 25 mounted on an encoder circuit board 24. Hall elements or the like are used as the magnetic sensors. A- and B-phase signals that differ in phase by 90° and indicate a rotational position of the motor rotor 8 are output from the encoder 20; and U-, V-, and W-phase magnetic pole signals that differ in phase by 120° and indicate a magnetic pole position of the motor are also output. A servo driver 40 controls to drive the AC servomotor 1 in accordance with commands from a host system 50 on the basis of these detection signals. The servo driver 40 is provided with a receiver circuit unit 41 for receiving signals from the encoder 20, and a control circuit unit 42 that includes a control computational circuit, a power drive circuit, and other components.

Figure 2:
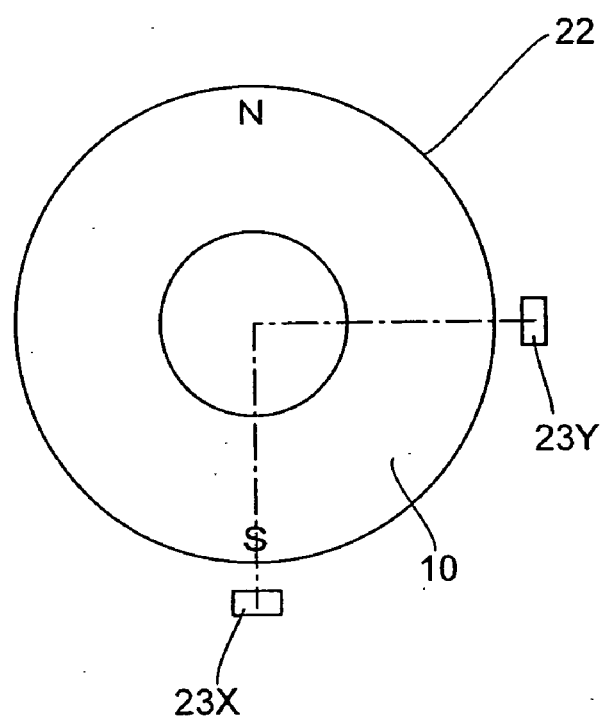
FIG. 2 is a schematic diagram showing the detection unit of the encoder of FIG. 1.
Figure 3:
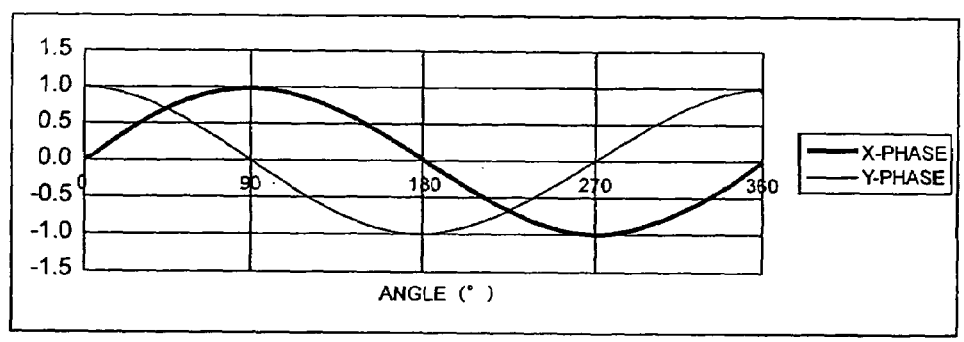
FIG. 3 is a signal waveform diagram showing the detection signals output from the magnetic sensors of the encoder of FIG. 1.

FIG. 2 is a schematic diagram showing a detection unit of the encoder 20. The rotational disk 22 of the encoder 20 is bipolarly magnetized, and the X-phase sensor 23X and the Y-phase sensor 23Y that face the external peripheral surface thereof are disposed with an angular spacing of 90°. Therefore, a detection signal is obtained from each sensor in the form of a single period of a sinusoidal wave for a single rotation of the rotational disk 22, and the phases of these signals are mutually offset by 90°. FIG. 3 is a signal waveform diagram showing an example of the sensor output signals. The bold curve shows an output signal waveform from the X-phase sensor 23X and the thin curve shows an output signal waveform from the Y-phase sensor 23Y.

Figure 4:
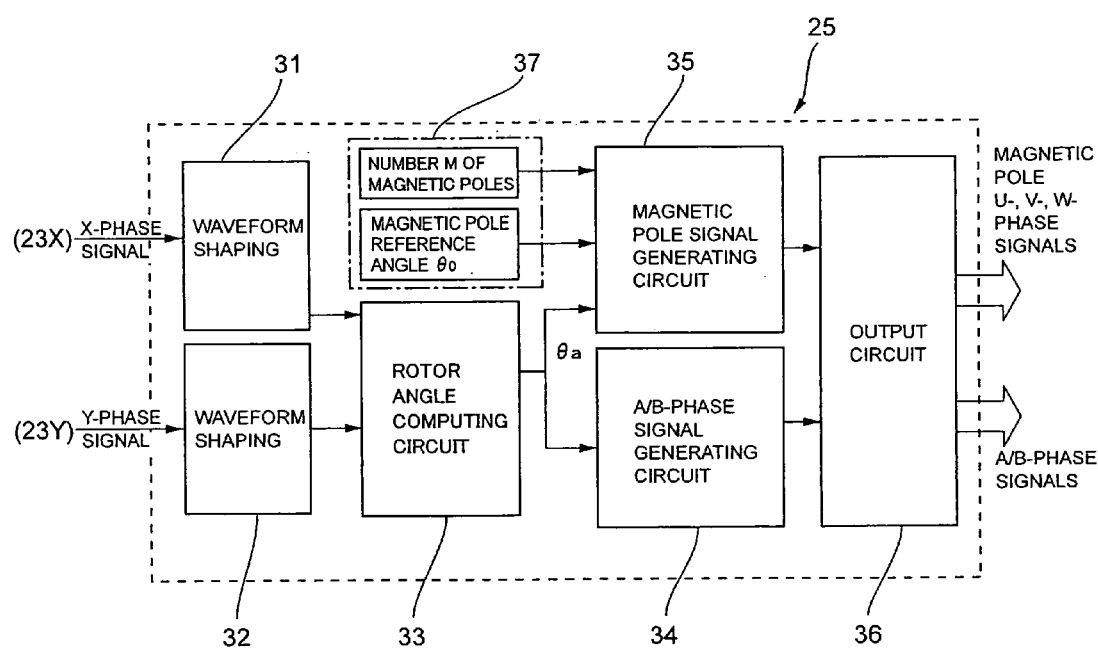
FIG. 4 is a schematic block diagram of the signal processing circuit of the encoder of FIG. 1.
Figure 5:
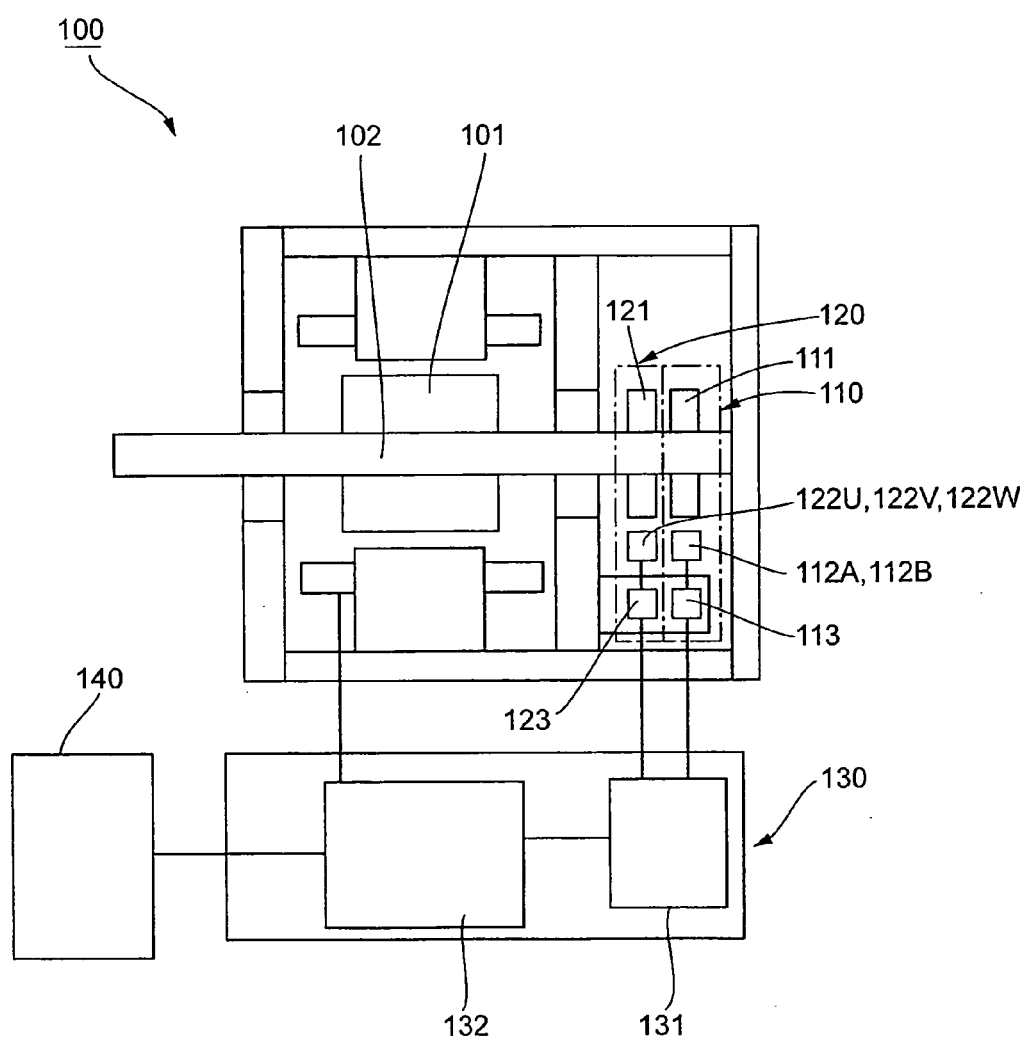
FIG. 5 is a schematic block diagram showing a common AC servomotor.
Figure 6:
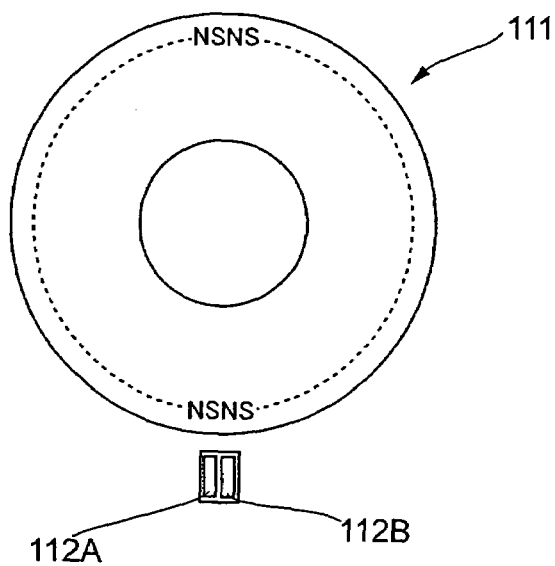
FIG. 6 is a schematic diagram showing the detection unit of the encoder mounted on the AC servomotor of FIG. 5.
Figure 7:
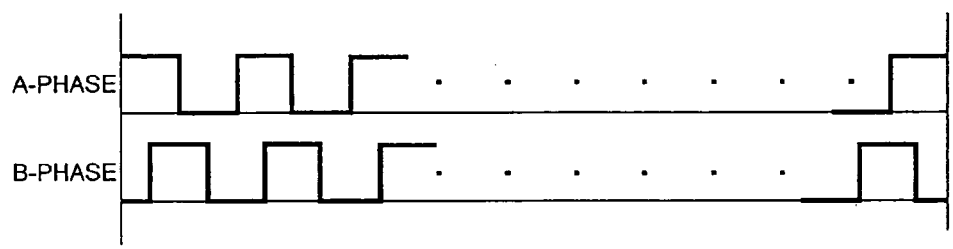
FIG. 7 is a signal waveform diagram showing the A- and B-phase signals obtained by processing the detection signals obtained from the detection unit of the encoder of FIG. 6.
Figure 8:
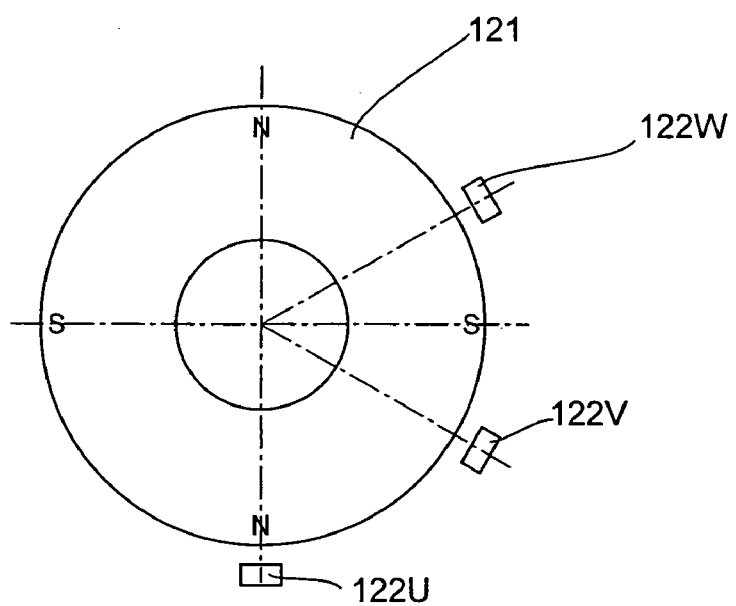
FIG. 8 is a schematic diagram showing the detection unit of the magnetic pole detection mechanism of FIG. 6.
Figure 9:
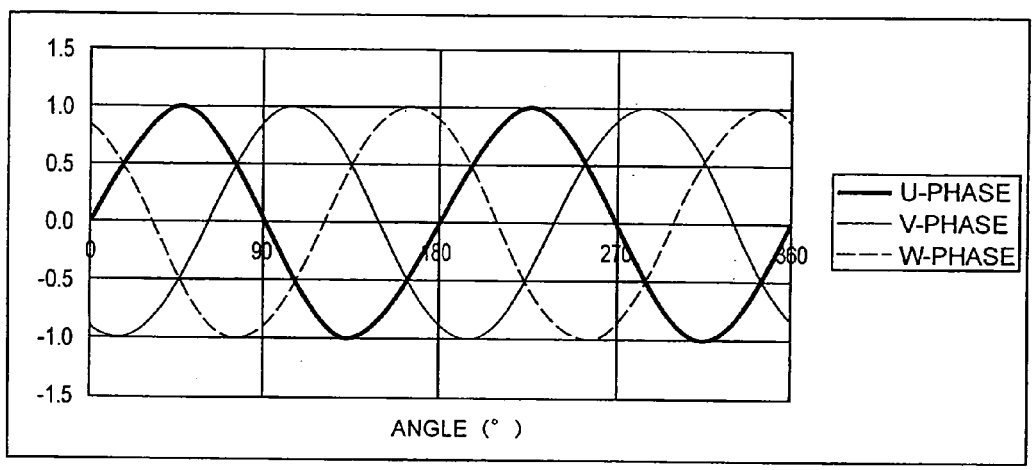
FIG. 9 is a signal waveform diagram showing the three-phase detection signal obtained from the detection unit of the magnetic pole detection mechanism of FIG. 6.
Figure 10:
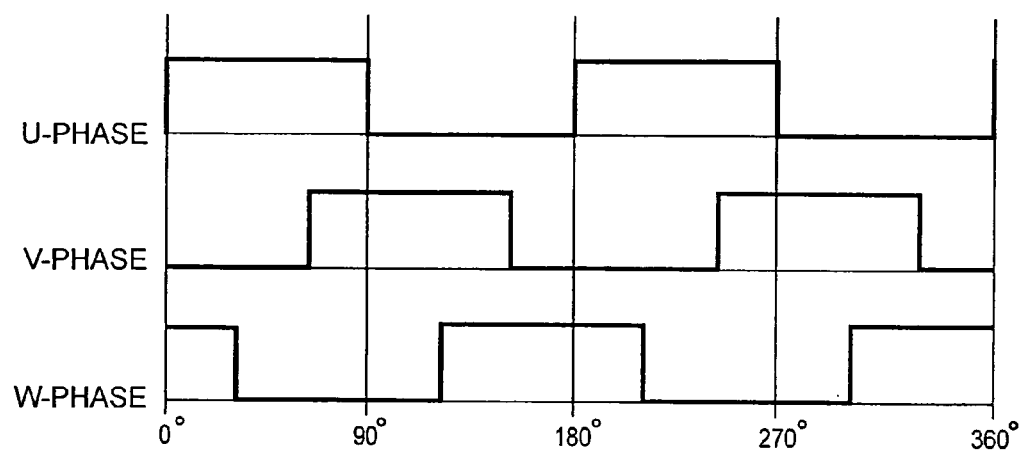
FIG. 10 is a signal waveform diagram showing the three-phase signals U, V, and W generated on the basis of the detection signals of FIG. 9.

FIG. 4 is a schematic block diagram of the signal processing circuit 25 of the encoder 20. The signal processing circuit 25 is provided with a waveform shaping circuit 31 for shaping the waveform of the X-phase signal obtained from the sensor 23X, and a waveform shaping circuit 32 for shaping the waveform of the Y-phase signal obtained from the sensor 23Y. The X- and Y-phase signals after waveform shaping are fed to a rotor angle computing circuit 33. The rotor angle computing circuit 33 samples the X- and Y-phase signals at predetermined cycles and computes the rotational angle of the motor rotor 8. The computed rotor angle $\theta a(t)$ is fed to an AB-phase signal generating circuit 34 and a magnetic pole signal generating circuit 35.

An A-phase signal with a predetermined fixed pulse cycle and a B-phase signal offset in phase by 90° are generated by the AB-phase signal generating circuit 34 on the basis of the rotor angle $\theta a(t)$ fed in a sequential fashion in prescribed cycles from the rotor angle computing circuit 33. The generated A- and B-phase signals are output to the signal receiver signal 41 of the servo driver 40 via an output circuit 36.

Three-phase magnetic pole signals U, V, and W that differ in phase by 120° are generated by the magnetic pole signal generating circuit 35 on the basis of the number M of magnetic poles of the AC servomotor 1, a magnetic pole reference angle $\theta o$ that indicates a magnetic pole position of the motor rotor 8 with respect to the magnetic pole position of the rotational disk 22, and the computed rotor angle $\theta a(t)$. The number M of magnetic poles and the magnetic pole reference angle $\theta o$ are stored in advance and held in a rewritable memory 37, and the values thereof are set in the memory 37 for each AC servomotor mounted with the encoder 20. The relationship between the number N (=2) of magnetic poles of the rotational disk 22 and the number M of magnetic poles of the motor is taken to be M=kN (where k is an integer of 1 or greater). A single hardware structure is sufficient for various numbers M of magnetic poles of the motor, such as 2, 4, 6, 8, and so on. The condition M=4 or greater is commonly true for a motor.

Thus, the encoder 20 of the present embodiment can generate A- and B-phase signals for indicating the rotational position and magnetic signals U, V, and W for indicating the magnetic pole positions by using a single rotational disk 22 and a pair of magnetic sensors 23X and 23Y. A resulting advantage is that an AC servomotor can be made smaller and lighter in comparison with mounting an encoder for detecting the rotational position and a magnetic pole detection mechanism for detecting the magnetic pole positions on the AC servomotor, as in the prior art. Also, a three-phase AC servomotor with a different number of magnetic poles can be used for mounting, and existing servo drivers can be used in unaltered form merely by varying the number of magnetic poles and the magnetic pole reference angle set in the memory 37.

By mounting the rotational disk 22 at a predetermined angle position when mounting the disk on the motor axle, it is possible to constantly compute $\theta o$ as a constant. In this case, the magnetic pole reference angle $\theta o$ does not need to be set in the memory 37, and the three-phase magnetic pole signals U, V, and W that differ in phase by 120° can be generated by the magnetic signal generating circuit 35 on the basis of the number M of magnetic poles of the AC servomotor 1 and the computed rotor angle $\theta a(t)$.

What is claimed is:

1. A motor encoder having:
   a bipolarly magnetized rotational body fixed coaxially on a motor axle;
   an X-phase magnetic sensor and a Y-phase magnetic sensor which are disposed facing an external peripheral surface of the rotational body and which output an X-phase signal and a Y-phase signal in the form of sinusoidal waves that differ in phase by 90° in association with the rotation of the rotational body;
   a rotor angle computing circuit for computing at prescribed cycles a rotor angle $\theta a$ of a motor rotor on the basis of the X-phase signal and Y-phase signal;
   a magnetic pole signal generating circuit for generating three-phase magnetic pole signals U, V, and W that differ in phase by 120° on the basis of the number M of magnetic poles of the motor and the computed rotor angle $\theta a$; and
   an AB-phase signal generating circuit for generating an A-phase signal and a B-phase signal at predetermined cycles that differ in phase by 90° on the basis of the rotor angle $\theta a$ computed at prescribed cycles.

2. The motor encoder according to claim 1, wherein M=kN (where k is an integer of 2 or greater), with N being the number of magnetic poles of the rotational body.

3. A motor encoder having:
   a bipolarly magnetized rotational body fixed coaxially on a motor axle;
   an X-phase magnetic sensor and a Y-phase magnetic sensor which are disposed facing an external peripheral surface of the rotational body and which output an X-phase signal and a Y-phase signal in the form of sinusoidal waves that differ in phase by 90° in association with the rotation of the rotational body;
   a rotor angle computing circuit for computing at prescribed cycles a rotor angle $\theta a$ of a motor rotor on the basis of the X-phase signal and Y-phase signal;
   a magnetic pole signal generating circuit for generating three-phase magnetic pole signals U, V, and W that differ in phase by 120° on the basis of the number M of magnetic poles of a motor, a magnetic pole reference angle $\theta o$ that indicates a magnetic pole position of the motor with respect to a magnetic position of the rotational body, and the computed rotor angle $\theta a$; and
   an AB-phase signal generating circuit for generating an A-phase signal and a B-phase signal at predetermined cycles that differ in phase by 90° on the basis of the rotor angle $\theta a$ computed at prescribed cycles.

4. The motor encoder according to claim 3, wherein M=kN (where k is an integer of 2 or greater), with N being the number of magnetic poles of the rotational body.

* * * * *